United States Patent

Shively et al.

[15] 3,681,877

[45] Aug. 8, 1972

[54] APPARATUS FOR CORRECTING NON-UNIFORMITY IN A ROTATING TIRE

[72] Inventors: Harmon G. Shively, Tallmadge; Clifford A. Landsness, Akron, both of Ohio

[73] Assignee: The B. F. Goodrich Company, New York, N.Y.

[22] Filed: Aug. 12, 1969

[21] Appl. No.: 849,340

[52] U.S. Cl. ............... 51/106 R, 51/165.9, 51/281, 51/324, 157/13
[51] Int. Cl. ............................................. B24b 5/00
[58] Field of Search ........... 51/165 R, 106 R; 73/146

[56] References Cited

UNITED STATES PATENTS

| 2,695,520 | 11/1954 | Karsai ..................... 73/146 |
| 2,766,563 | 10/1956 | Bennett ................... 51/33 X |
| 2,966,011 | 12/1960 | Beacock .................... 51/33 |
| 3,500,681 | 3/1970 | Shively ..................... 73/146 |
| 3,553,903 | 1/1971 | Christie ............... 51/106 R X |
| 3,574,973 | 4/1971 | Rader .................... 51/165.9 |

FOREIGN PATENTS OR APPLICATIONS

1,177,328 1/1970 Great Britain .......... 51/165 R

*Primary Examiner*—Lester M. Swingle
*Attorney*—W. A. Shira, Jr. and Harold S. Meyer

[57] ABSTRACT

The method and apparatus for reducing the radial force variation of a rotating tire by grinding from the tread a portion thereof as determined by the radial motion of a floating load wheel which provides an electrical signal proportional to the movement of the load wheel axis. The electrical signal is employed in a circuit such that when a reference voltage is exceeded, the signal is effective to move a grinder to and away from contact with the tire tread in increments of constant radial depth but of varying time duration. The apparatus comprises a tire uniformity machine having a pulse generator synchronized with the tire rotation so each pulse indicates a unit angle of tire rotation. A comparator conducts the pulses only when the signal from the uniformity machine exceeds a predetermined value such that the pulses activate alternately a pair of one-shot multivibrators which energize actuating solenoids for applying or retracting the grinder. The solenoids move a bell crank which causes a snap-action toggle to advance or retract the grinder with respect to the tire tread.

9 Claims, 5 Drawing Figures

APPARATUS FOR CORRECTING NON-UNIFORMITY IN A ROTATING TIRE

BACKGROUND OF THE INVENTION

It is essential that pneumatic tires for vehicles, such as passenger automobiles, exert a minimum force variation on the axle while running under load in order to prevent undesirable oscillations of the vehicle suspension. Therefore, the dynamic variation in the forces radially applied to the axle while the tire is rotating must be kept to a minimum in order to produce this result. When the allowable limits of radial force variation of the completed tire are exceeded, the tire is generally unusable for passenger car service. This requires that the pneumatic tires be manufactured or corrected to maintain within predetermined limits the eccentricity or radial runout, carcass flex-stiffness and lateral oscillation. One method of reducing the radial force variation of a completed tire is that of buffing or grinding rubber from the tread region of the tire, preferably from the axial edges thereof.

In the manufacture of pneumatic tires, one common means of determining the radial force variation of a completed tire is that of testing the tire on a "uniformity machine." In this type machine, the tire is mounted on a rim and in the inflated state is rotated at a nearly constant speed. A movable load wheel is urged into contact with the tread of the tire while it is rotating. The load wheel has sensors, usually electrical transducers, attached to its shaft, or axle mounting, such that motion of the load wheel is detected in a direction radial to the tire and an electrical signal varying proportionally to the load wheel movement is provided. The varying voltage of the electrical signal corresponds to the variation in radial force of the tire tread against the load wheel since the movement of the load wheel is directly proportional to the variations in radial force exerted by the tire on the load wheel.

In order to reduce the radial force variation by removing material from the tread region while the tire is rotating on a uniformity machine, it is necessary to apply the varying electrical signal from the load wheel transducers to a controlling and actuating mechanism for operating the material remover which may be a buffer, or grinder, as the case may be. A convenient technique of providing grinder or buffer operation has been to drive the grinder at a fixed rotational speed and alternately move the grinding wheel into contact with the tire tread and then away from the tread.

Heretofore, in order to control the amount of material removed from the tire tread region by the grinder, attempts have been made to control the radial depth of penetration of the grinder in the tire tread by making the radial movement of the grinder proportional to the voltage of the electrical signal emanating from the load wheel transducers. This type of grinder control is often called a "linear" system in view of the attempts to make the grinder movement directly proportional to the magnitude of voltage of the continuously varying electrical signal.

In practice, the linear type of grinder control is extremely difficult to achieve in order to remove enough material from the tire tread at the proper peripheral location on the tire when the tire is rotating at even modest speeds. The problem is due primarily to the difficulty in moving the large mass of the grinder alternately radially inwardly and outwardly at sufficient speed to provide the required grinder responsiveness to the variation in the electrical signal voltage at the frequency produced by the tire rotational speed. This difficulty has served to render an otherwise useful method of salvaging defective tires impractical in view of the complexity and cost of machinery necessary to provide adequate grinder response movement.

Heretofore, a grinder capable of removing material rapidly enough to enable grinding at typical tire uniformity test rotation speeds exhibited such a large mass that the actuators and controls, for providing the force required to move the grinder quickly enough to grind only at the proper tire location, did not have sufficient sensitivity to respond to the frequency of the signal from the load wheel sensors. Thus, the method of grinding tire treads to reduce variation in tire radial force to acceptable limits for use in passenger vehicle production has required grinding equipment of great complexity and prohibitive cost.

SUMMARY OF THE INVENTION

The present invention provides a solution to the problem of removing material from the tread region of a rotating tire by moving the grinder radially into and away from contact with the tire tread in increments of constant radial depth but of varying time duration. The varying electrical signal from the load wheel sensors of a uniformity testing apparatus is compared with a fixed reference voltage level representing the maximum allowable variation in radial force and is conducted only when the voltage exceeds the reference level. A series of equal electrical pulses, each representing a unit angle of tire rotation is provided by a generator on the rotating tire axle and these pulses are permitted to be conducted only when the signal from the load wheel sensors exceeds the reference level. The pulses are applied to a pair of single pulse generators which alternately energize actuators for moving a grinder either into contact or away from the tire tread. The actuators are interconnected to a snap-action, spring loaded toggle which is set close to the trip point such that only a small force from either actuator is required to trip the toggle which moves the grinder a fixed radial distance either into contact with or away from the tire tread.

DETAILED DESCRIPTION

Figure 1:
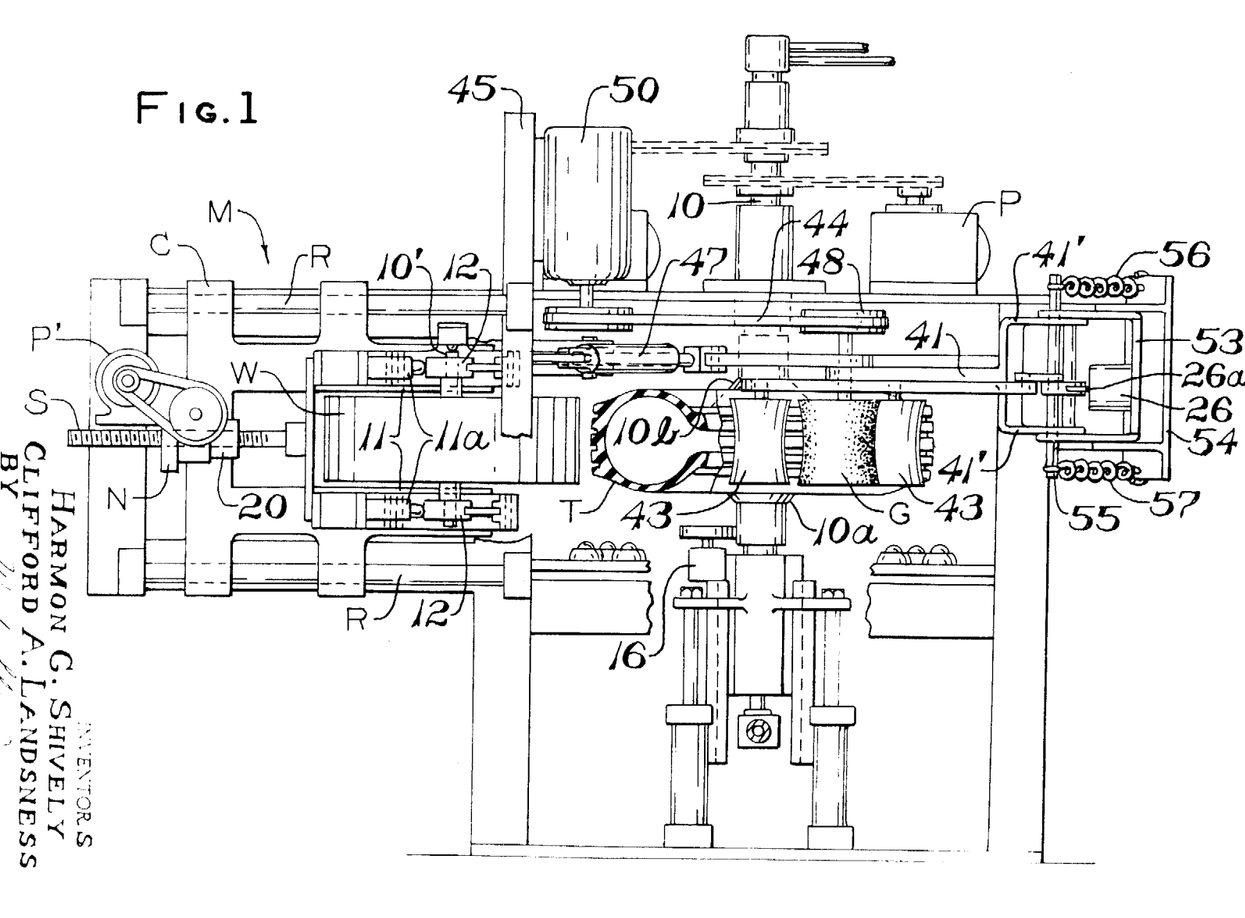
FIG. 1 is a side elevation view of a tire uniformity machine incorporating the present invention in its preferred embodiment.

Referring now to FIG. 1, a tire uniformity machine M is shown in side view having a tire T mounted therein on a vertically disposed axle arrangement which, in the usual practice, comprises two movable rotatable chuck plates 10a and 10b such that the tire may be mounted inflated and rotated about a vertical shaft 10. A load wheel W is positioned such that it may be moved radially into contact with the tread of the tire. The load wheel is supported by bearings 12 at the ends of the vertical shaft 10' and the bearings are resiliently mounted on flex plates 11 such that the load wheel can move in its plane of rotation in a direction perpendicular to its axle 10'. Sensors 11a are mounted on the flex plates 11 for determining the motion of the load wheel axle. In the preferred practice of the invention, the sensors 11a comprise electrical transducers which provide a varying electrical signal with the magnitude of the voltage signal directly proportional to the radial displacement of the load wheel axle 10'. The tire T is rotated by a power means P connected to its axle 10 and mounting chucks 10a and 10b of the tire.

The load wheel and its axle 10' and bearing assembly are mounted on a movable carriage C which is slidably mounted on rails R to urge the load wheel W into contact with the tire tread. The load wheel is shown in the retracted position in FIG. 1 with the surface of the wheel not contacting the tire tread. A threaded power nut N is engaged with a threaded jack screw S attached to the carriage C and the threaded nut is rotated by a motor and transmission assembly P'. Rotation of the nut N causes the load wheel to be brought to and from contact with the tire tread. The arrangement of the tire uniformity machine in FIG. 1 may be essentially as described in a co-pending application assigned to the assignee of the present invention and entitled APPARATUS FOR LOCATING MAXIMUM RADIAL FORCE VARIATION IN A TIRE, Ser. No. 751,969, filed Aug. 12, 1968, now U.S. Pat. No. 3,500,681, dated Mar. 17, 1970, in which application is disclosed and claimed the machine and its operation for providing an electrical signal for indicating force variation in the tire.

Figures 2, 3:
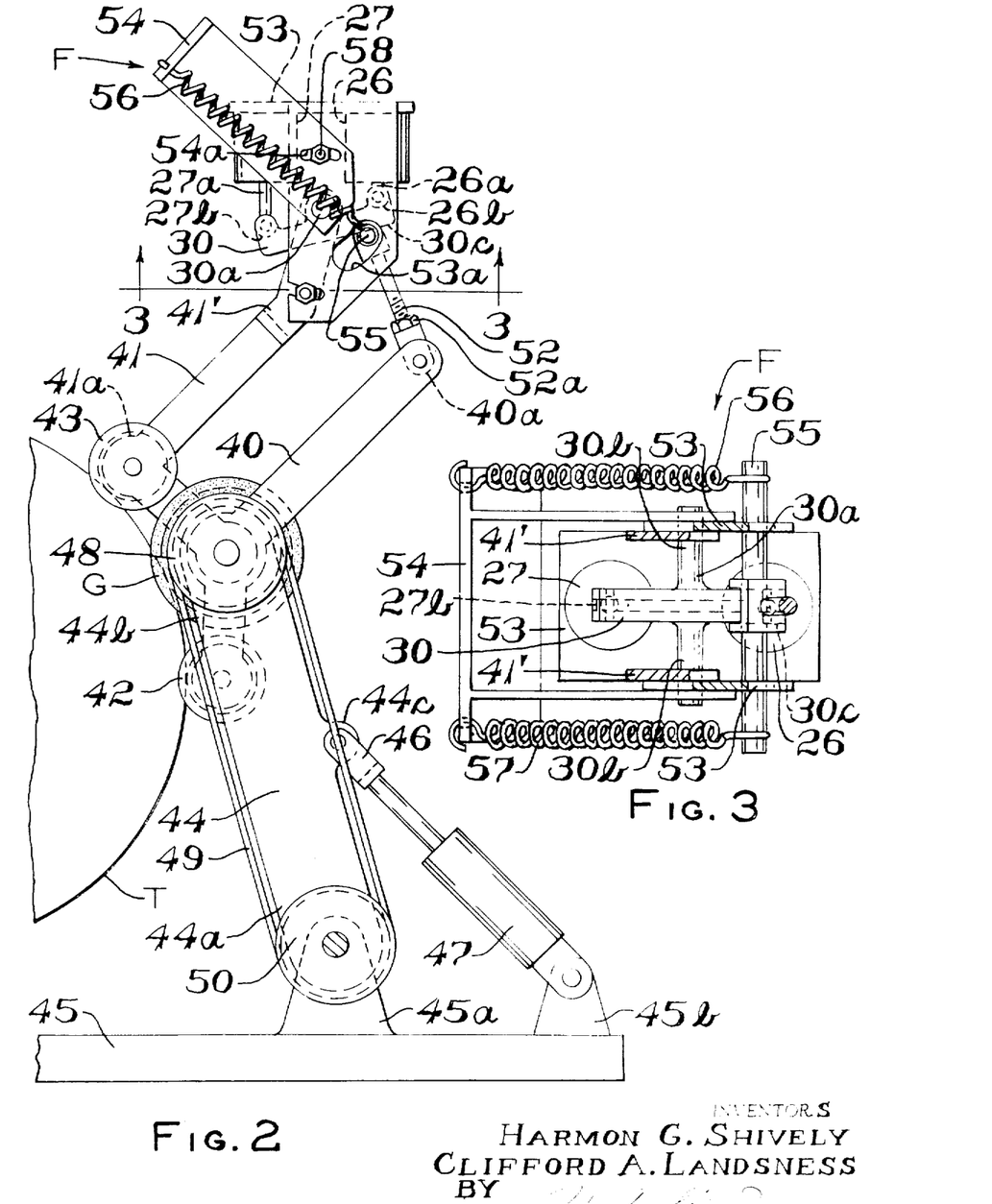
FIG. 2 is a plan view of the grinder and actuator portion of FIG. 1.
FIG. 3 is a portion of a sectional view taken along the section indicating lines 3—3 of FIG. 2.

Referring now to FIGS. 2 and 3, the detail of the grinder mechanism are shown enlarged from FIG. 1 such that the description thereof may be more clearly understood. The grinder G is rotatably mounted on a lever 40 intermediate the ends thereof and a second lever 41 has one end pivotally attached to lever 40 at the point where the grinder G is mounted thereon. Levers 40 and 41 intersect and are pivotally attached such that each may be moved with respect to the other with the grinder G being free to rotate and unaffected in its rotation by the scissor-like movement of either lever 40 or 41.

One end of the lever 40 has a register means 42 attached thereto for making contact with the tire tread. Similarly the lever 41 has a portion 41a intermediate the ends thereof which portion has a second register means 43 attached thereto for making running contact with the tire tread. In the preferred form of the invention, the register means 42 and 43 comprises a pair of spaced idler rollers rotatably mounted respectively to levers 40 and 41. The rollers 42 and 43 are spaced closely adjacent on opposite sides of the grinder with the axis of rotation of each idler parallel to that of the grinder. In operation, scissoring the levers 40 and 41 moves the idlers toward or away from each other, thereby advancing or retracting the grinder G radially with respect to its position in relation to the tire tread. Levers 40 and 41 are scissored such that when the idler rollers 42 and 43 are advanced toward the center of the rotating tire: the grinder G is thus retracted from grind position. When the levers 40 and 41 are scissored such that the idlers 42 and 43 are retracted away from the center of the tire, the grinder G is advanced toward and urged into contact with the tire tread for removing material therefrom.

The grinder and actuator assembly is supported by an elongated bar 44, see FIG. 2, having one end 44b pivotally attached to the intersection of lever-arms 40 and 41 and the other end of the bar 44 pivotally attached to a frame means 45 at a pivot mount 45a provided thereon for connecting to the said bar. The frame means comprises a portion of the frame of the machine shown in FIG. 1. The bar 44 has a mounting portion 44c intermediate the ends thereof with a clevis 46 pivotally attached thereto, which clevis is interconnected to an actuator 47 having one operative portion thereof pivotally connected to a second mounting portion 45b spaced from the pivot mount portion 45a on said frame. In the preferred practice of the invention, the actuator 47 comprises a pneumatic or hydraulic power cylinder with one end connected to clevis 46 and the other end pivotally attached to the frame 45. In operation power cylinder 47 operates to rotate the arm 44 about the first mount portion 45a of the frame such that the entire grinder assembly is moved toward or away from the rotating tire. The power cylinder 47 is operated to urge the grinder and idler rollers 42 and 43 into contact with the tire tread, it being determined by the scissored position of the levers 40 and 41 with respect to each other whether or not the grinder contacts the tire. However, the idler rollers 42 and 43 are preferably positioned such that initially the rollers engage the tire tread, the grinder G remaining spaced from the tire tread.

A pulley 48 is provided on the shaft of the grinder G and is operatively interconnected by means of a driving belt 49 to a power means 50 rigidly attached to frame 45. In the presently preferred practice, power means 50 is a motor having its shaft of rotation axially coincident with the center of pivot of the end 44a of the bar 44. This permits the arm 44 to be rotated about its pivotal attachment to the frame without changing the distance between the pulley 48 and the shaft of the motor, thus maintaining constant tension in the drive belt 49 in all positions of the arm 44.

The free end of the lever 40 has a clevis 40a attached thereon. The free end of the lever 41 has a fork 41' rigidly formed therein with the arms of the fork extending from the lever 41 in spaced mutually parallel arrangement with each arm of fork 41' parallel to the length of the arm 41. The bell crank 30 having rigidly mounted intermediate its ends a rigid pivot shaft 30a extending perpendicularly from the bell crank. The ends 30b of the shaft are rotatably mounted between the arms of the fork 41' such that the pivot shaft 30a is parallel to the axis of rotation of the grinder. The bell crank 30 also has a portion 30c, see FIG. 3, extending therefrom, which portion has one end of a linkage bar 52 pivotally attached thereto and the other end of the linkage bar pivotally attached to the clevis 40a on the end of the arm member 40. In operation, rotation of the bell crank about its shaft 30a causes the linkage bar 52 to operate as a toggle for scissoring the ends of the arm members 40 and 41 with respect to each other. As described above, this movement then causes the idler rollers 42 and 43 to move together or further apart, thereby extending or retracting the grinder respectively away from or towards the center of the tire.

A U-shaped bracket 53, having each of its open ends adjustably attached to one end respectively of the fork 41', see FIGS. 2 and 3, has mounted in the closed portion thereof actuator means 26 and 27 for rotating the bell crank. As described above with reference to FIG. 4a and 4b, the actuator means comprise respectively a pair of electrical solenoids 26 and 27. Each solenoid has respectively an armature 26a and 27a extending therefrom with each armature having respectively a clevis 26b and 27b attached to the end thereof. The clevis 26b is attached to one arm of the bell crank 30 such that, upon electrical energizing, the solenoid 26 causes the armature 26a to retract, thereby rotating the bell crank in a direction such that the bar 52 causes lever-arms 40 and 41 to scissor with respect to each other in a manner spreading the idler rollers 42 and 43 further apart and permitting the grinder G to contact the tire. The clevis 27b is pivotally attached to an arm of the bell crank on the opposite side of the pivot shaft 30a from the clevis 26b. In operation, electrical actuation of solenoid 27 causes the armature 27a to retract, thus rotating the bell crank 30 in a direction such that the linkage 52 scissors lever arm members 40 and 41 in a manner converging idler rollers 42 and 43 toward each other thereby retracting the grinder G from material removing position.

Thus, the grinder G is advanced toward or retracted away from material-removing, or grinding, position by alternate actuation of the solenoids 26 and 27. The limitations of the actuating stroke of the solenoids thus determine the limit of radial travel of the grinder. The grinder thus operates in a succession of predetermined fixed radial movements toward or away from the tire, with each movement providing the same depth of penetration of the grinder into the tire tread as the previous movement.

A snap-action means indicated by arrow F in FIG. 2 and FIG. 3 is provided to assist the toggle action of the bell crank 30 and the linkage bar 52 such that in the retracted or "no grind" position, the snap-action mechanism F is near the trip point. A small amount of movement of the armature 26a of the "grind" solenoid causes the snap-action mechanism F to go over center and provide a continuing force assist to movement of the bell crank 30. In the "grind" position the snap-action means is near the trip point for the return stroke such that a small amount of movement of the armature 27a of the "no grind" solenoid 27 causes the snap-action means to throw over center and give force assistance to the retracting stroke of the bell crank 30.

In the preferred form of the invention, the snap-action means F comprises a generally $\pi$-shaped frame 54 having the open ends of the sides thereof adjustably attached to the sides of bracket 53. A connecting bar 55 extends through the pivotal connection between the linkage bar 52 and the arm 30b of the bell crank and also extends through clearance holes 53a formed one in each side of the bracket 53 such that movement of the bell crank causes the bar 55 to move laterally within the clearance holes 53a. A pair of coil springs 56 and 57 is provided with the end of one spring attached each to one end of the bar 55 and the opposite end of the coil spring anchored to an extension of the closed end of the bracket 54. The springs are disposed such that snap-action occurs about a line through the pivot center of the bell crank passing through the end of the coil spring anchored to the bracket 54. The springs are thus positioned in mutually parallel arrangement and provide a snap-action of the bell crank 30 about its pivot axis. An adjustment means 58 is provided at the attachment of the bracket 54 to the bracket 53 such that the position of the coil springs may be changed for effecting a snap-action pivoting of the bell crank at a different position in its rotation. In the preferred form of the invention, the adjustment is provided by a slot 54a in each side of bracket 54 and a threaded bolt 58 attached respectively to each side of the bracket 53. The bracket 54 is pivotally mounted about the pivot center of the bell crank and it is attached to bracket 53 such that the attachment bolts 58 may be loosened and bracket 54 pivoted about the bell crank pivot center and the bolts 58 then tightened to secure the new position of the bracket 54 with respect to bracket 53 thus permitting variation in the snap position of the bell crank.

A further adjustment in the mechanism is provided by a sleeve nut 52a attached to the linkage bar 52 such that the bar may be lengthened or shortened by rotation of the sleeve nut. This permits changes in the relative positions of the arms 40 and 41 with respect to each other such that the idler wheels 42 and 43 may be adjusted with respect to the grinder G.

In operation, the power cylinder 47 is actuated by an independent source to move arm 44 to bring the idler rollers 42 and 43 into running contact with the rotating tire T when it is desired to begin the material-removing cycle. The motor 50 may then be started to bring the grinder wheel G to the desired rotational speed.

Figure 4A:
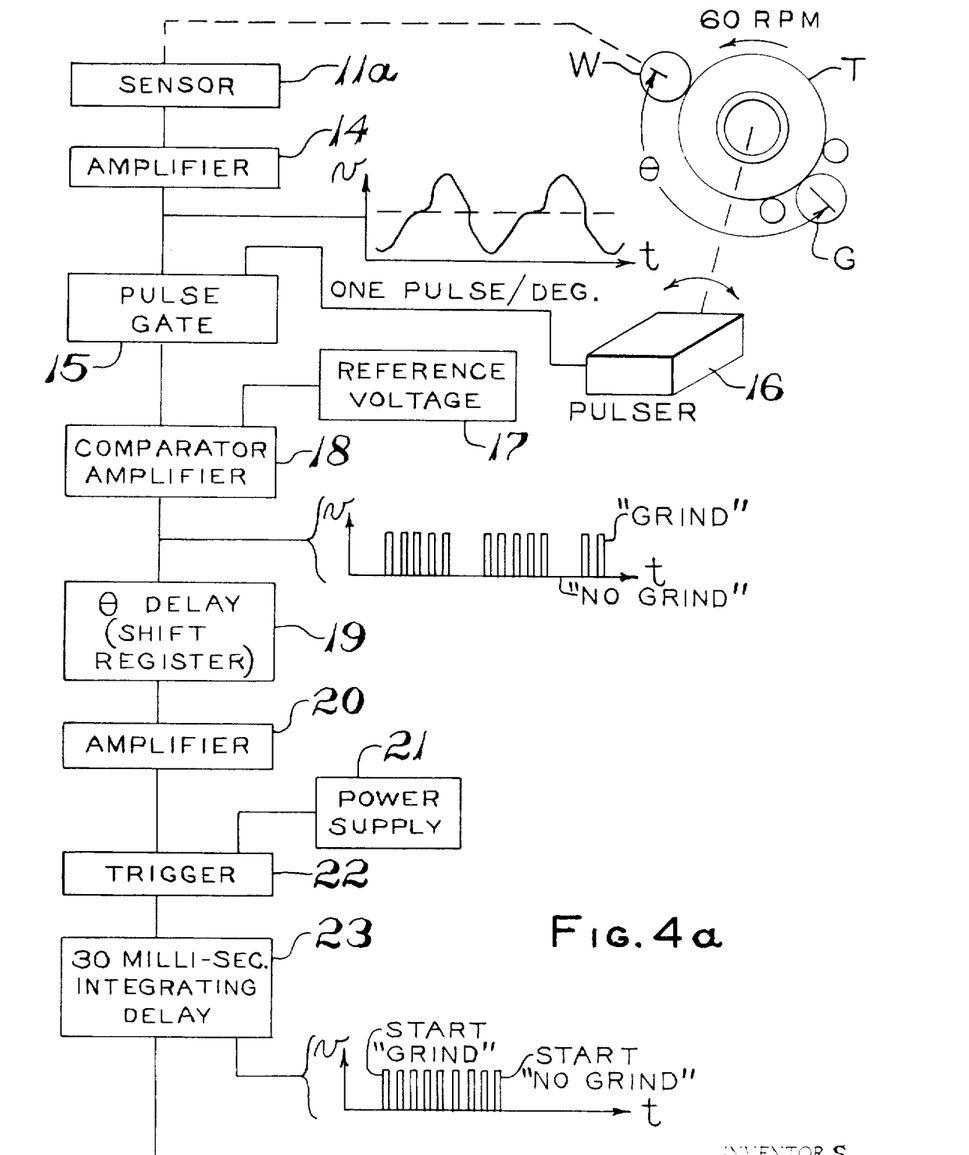
FIG. 4a and 4b, when placed in vertical alignment, comprise a block flow diagram of the control circuit for operating the grinder.
Figure 4B:
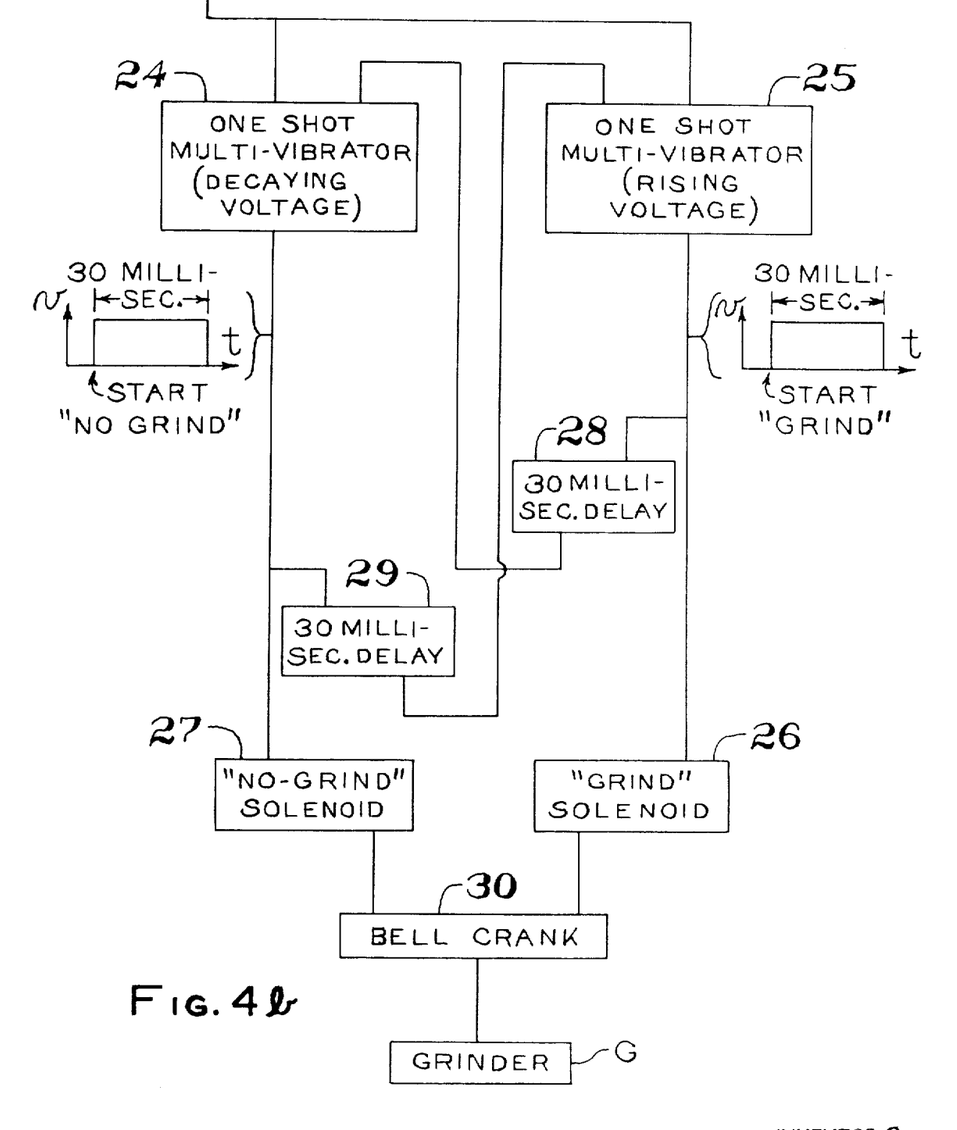

Referring now to FIG. 4a and 4b, a schematic flow diagram is shown in which the signal from the sensors 11a is fed to amplifier 14 and then to a pulse-gate 15. A pulse generating means, or pulser, 16 (see also FIG. 1) is driven by the tire axle 10 such that rotation of the tire mounted thereon causes the pulse generator to transmit equal pulses with each pulse representing a unit angle of tire rotation. In the preferred practice of the invention, the pulse generator 16, or pulser, as it is labeled in FIG. 4a, has an output signal of one pulse per degree of tire rotation, which output is applied to the input of the pulse-gate. The pulser 16 may be of any convenient commercial type. In the present practice of the invention, a Rotaswitch Pulser, Model No. 815-P3431, manufactured by the Disc Instrument Company, has been used, but any other commercially available unit may be employed. Similarly, the pulse-gate 15 may be of any standard construction or type known in the art and it may be of semi-conductor or vacuum-tube design. Operation of the pulse-gate 15 is such that the signals from the amplifier 14 are not transmitted by the pulse-gate unless the pulse-gate 15 is receiving pulses from the generator 16.

The signals passed from the pulse-gate 15 are then applied to a comparator amplifier 18 which receives also a voltage from a reference source 17. The comparator amplifier 18 operates as a summing amplifier such that the pulses are transmitted to its output only when the voltage signal from the sensors exceeds the level from the reference source 17. The reference voltage is a predetermined value to represent the maximum allowable limit of radial force variation which is permissible in the tire. When the signal from the sensors exceeds this level in magnitude, the pulses from the generator 16 are transmitted and used to initiate the grinder operation.

Signals from the comparator amplifier 18 are applied to the input of a delay means 19 which serves to delay the signal an amount in tire rotation time represented by the angular distance the tire must rotate for a point under the load wheel to pass under a grinder G. This angular distance is represented in the upper right-hand portion of FIG. 4a by the Greek letter Theta $\theta$. The grinder G is located at a convenient position around the tire and delay means 19 is used to synchronize operation of the grinder with passage of the point associated with a high radial force value, such that the grinder G does not operate until the point passes in rotation directly beneath the grinder.

The delay means 19 preferably comprises a static shift register which may be of conventional design known in the art and may be of vacuum-tube or semiconductor design or may employ relays. In the presently preferred practice the shift register is a Motorola static eight-bit shift register, Model MC845P. The pulse signals from the shift register are applied to a second amplifier 20 and subsequently applied to an electrical trigger 22 which is supplied power from the power supply 21. The trigger 22 serves to apply sufficient power to means for moving the grinder toward and away from the tire tread. The trigger 22 may be of any conventional construction known in the electrical art. In the preferred practice of the invention, a silicon control rectifier (SCR) firing circuit is employed with the signal from amplifier 20 applied to the gate junction of the SCR. The signal from the trigger is then applied to the grinder moving means through an intermediate integrating delay 23 and simultaneous application to a pair of intermediate single pulse generators 24 and 25.

The integrating delay 23 is preferably a 30 millisecond delay to prevent activation of either multivibrator upon receipt of a series of pulse signals of a duration less than 30 milliseconds. However, any convenient time value may be used for the delay 23, the choice being governed by the mechanical time response of the grinder mechanism in moving toward and away from the tire tread. The single pulse generators 24 and 25 are preferably one-shot multi-vibrators with the generator 24 operating only upon excitation by the decaying voltage portion of the pulse signal, the generator 25 being energized only upon receipt of the rising voltage portion of the pulse signal. The output of the multivibrator 24 is applied to an actuator 27 which retracts the grinder G from contact with the tire tread and the output of multivibrator 25 is applied to an actuator 26 which moves the grinder G to contact the tire tread. In the presently preferred practice of the invention, the actuators 26 and 27 each comprise an electrical solenoid having an armature therein with one end of each armature connected to bell crank 30 which in turn is connected to the grinder G.

In operation, when a signal from the multivibrator 25 is received, by the rising voltage of the first pulse in each group of pulses applied to the multivibrator, the solenoid 26 is activated, which causes the bell crank to move the grinder into material-grinding position. As the group of pulse passes, application of the decaying voltage portion of the last pulse in the group to multivibrator 24 causes the solenoid 27 to be activated, which in turn rotates the bell crank in the opposite direction, thereby retracting the grinder from material-grinding position.

The design of each of the multivibrators 24 and 25 is such that the pulse width of the output signal is greater than the time response of the grinder activating mechanism to prevent signals, which have a time duration less than the response capability of the solenoid activating device, from being applied to the solenoid. It will be readily apparent that such an arrangement is necessary to prevent chatter of the solenoid actuating mechanism.

The output of multivibrator 25 is also applied to a 30 millisecond delay 28 and the output thereof is fed back into the input of the decaying-voltage sensitive multivibrator 24. Similarly, the output of multivibrator 24 is applied also to a 30 millisecond delay 29 the output of which is fed back into the input of the multivibrator 25. This arrangement provides a cross-coupled delay feedback of the multivibrator outputs and in operation serves to prevent either multivibrator from activating for a period of time equal to the pulse width of the output of the multivibrators.

In FIG. 4b, the multivibrator 25 and solenoid 26 which cause the grinder to move into contact with the tire are labeled as a "grind" function and the multivibrator 24 and solenoid 27 for retracting the grinder from material grinding position are labeled as the "no grind" function. Referring, in FIG. 4b, to the electrical output of comparator amplifier 18, the maximum voltage of the pulse signals therefrom represents a "grind" signal and the zero voltage level between pulse groups represents the "no gring" portion of the signal. With respect to the signal applied to the input of the multivibrators, the rising voltage side of the pulse group represents the "start grind" function and the decaying voltage side of the pulse group represents the "start no-grind" function.

Upon receipt of electrical pulse signal from the one-shot multivibrator 25 the "grind" solenoid 26 is actuated to rotate the bell crank, thereby scissoring lever arms 40 and 41 such that the idler rollers 42,43 are moved farther apart and the rotating grinder G is moved a predetermined distance into contact with the tire tread for removing material in the tread region. When an electrical pulse signal is received from the one-shot multivibrator 24 by the "no-grind" solenoid 26, the armature of the solenoid is actuated to rotate the bell crank 30 in a direction such the lever arms 40,41 are scissored and the idler rollers 42,43 are moved closer together thereby retracting the grinder G from material removing position. Thus, alternate actuation of the "grind" solenoid 26 and the "no grind" solenoid 26 and the "no grind" solenoid 27 provides movement of the rotating grinder G a predetermined distance into and away from the material-removing position. Springs 56 and 57 provide a snap-action force assist to rotation of the bell crank. Upon completion of the grinding cycle, e.g., when the magnitude of signals from sensor 11a are no longer in excess of the reference voltage for the predetermined minimum time duration, the power cylinder 47 is actuated to pivot arm 44 and move the grinder assembly out of material-removing position, in a direction radially outward of the tire, such that the idler rollers no longer run against the rotating tire.

The operation of the present invention thus provides for separate actuators for moving the grinder a predetermined and fixed distance into contact with, and away from, the tire tread upon receipt of a "grind" or a "no grind" signal to the respective actuators. This technique is in contrast to one commonly known system wherein attempts have been made to mechanically actuate the grinders to move a distance into contact and away from the tire directly proportional to the continuing variation in the voltage from the radial force measuring sensors. The grinder in the present invention thus is urged into contact with the tire, grinds for a time determined by the pulse width of an electrical "grind" signal and then is retracted from the grind position until receipt of another "grind" signal.

Modifications and adaptations of the invention may be made by those having ordinary skill in the art with the invention being more particularly defined by the following claims.

We claim:

1. An apparatus for reducing the magnitude of radial force variation in a pneumatic tire comprising:
    a. means for supporting and rotating the tire in inflated condition about its axis;
    b. means responsive to radial force variation in the rotating tire to provide an electrical signal the amplitude and duration of which is indicative of such force variation;
    c. means supported adjacent the tire for movement a predetermined distance to and from engagement therewith which means is capable of removing a portion of the tire tread when in engagement with the tire;
    d. means for providing a reference voltage representative of a minimum level of said radial force variation;
    e. means responsive to the onset of that portion of said signal in excess of a said reference voltage for initiating movement of said material-removing means into engagement with the tire;
    f. means responsive to the recession of said signal below said reference voltage to withdraw said material-removing means from contact with the tire; and
    g. means attached to said material-removing means having a portion adapted to contact said tire to provide a reference base for the movement of the said material-removing means.

2. The apparatus defined in claim 1, wherein said material-removing means includes means for effecting a snap-action of said material-removing means into and away from contact with the tire tread.

3. The apparatus as defined in claim 1, wherein
    a. the said material-removing means is spaced peripherally a distance along the tire tread from said means to provide the signal; and,
    b. the said means responsive to onset of the portion of said signal in excess of the reference voltage includes means to delay actuation of said material-removing means an amount in tire rotation time corresponding to the said distance between said means to provide the signal and said material-removing means.

4. The apparatus defined in claim 1, wherein said means responsive to the onset and said means responsive to the recession of said portion of said signal in excess of said reference voltage includes:
    a. electrical pulse generating means emitting a series of equal duration direct current pulses which pulses are synchronized with rotation of said tire such that each pulse represents a unit angle of tire rotation;
    b. electrical pulse gate means electrically connected to receive said electrical signal and said direct current pulses, the said pulse gate means being operative to pass said electrical signal only when said pulses are received from said pulse generating means; and
    c. electrical comparator means electrically connected to the output of said pulse gate means and to said reference voltage with the comparator operative to conduct said pulses only when said electrical signal exceeds said reference voltage.

5. The apparatus defined in claim 1, wherein said means adjacent the tire for movement a predetermined distance to and from engagement therewith comprises:
    a. a frame means;
    b. a grinder;
    c. means pivotally attaching said grinder to said frame; and,
    d. actuator means operatively connected to the last-mentioned means for effecting movement of said grinder toward and away from said tire.

6. The apparatus defined in claim 5, wherein said pivotal means includes:
    a. toggle means operative to move said grinder radially relative to and from contact with the tire; and
    b. a pair of electrical solenoids each having an armature pivotally connected to said toggle means for alternate operation of the latter to effect said movement of the grinder respectively toward and away from said tire.

7. The apparatus defined in claim 6, wherein said toggle means has spring means attached thereto for effecting snap-action of said grinder in its movement to and from engagement with the tire.

8. The apparatus defined in claim 1, wherein said means attached to said grinder includes a pair of spaced rollers supported on said toggle means with the rollers individually disposed on opposite sides of said grinder.

9. The apparatus as defined in claim 1, further comprising means for adjusting the position of said grinder relative to said reference base to thereby alter the extent of radial movement of the grinder relative to the tire.

* * * * *

UNITED STATES PATENT OFFICE
CERTIFICATE OF CORRECTION

Patent No. 3,681,877     Dated August 8, 1972

Inventor(s) Harmon G. Shively and Clifford A. Landsness

It is certified that error appears in the above-identified patent and that said Letters Patent are hereby corrected as shown below:

In the references cited, "Beacock" should read ---Peacock---.
Column 8, line 42, "no gring" should read ---no grind---.
Column 8, lines 63 and 64, delete "and the 'no grind' solenoid 26".

Signed and sealed this 10th day of April 1973.

(SEAL)
Attest:

EDWARD M. FLETCHER, JR.          ROBERT GOTTSCHALK
Attesting Officer                Commissioner of Patents